United States Patent [19]

Snow

[11] Patent Number: 5,353,685
[45] Date of Patent: Oct. 11, 1994

[54] REDUNDANT FLUIDIC MULTIPLEXER

[75] Inventor: Barton H. Snow, Wyoming, Ohio

[73] Assignee: General Electric Company, Cincinnati, Ohio

[21] Appl. No.: 133,683

[22] Filed: Oct. 7, 1993

Related U.S. Application Data

[63] Continuation of Ser. No. 571,043, Aug. 22, 1990, abandoned.

[51] Int. Cl.⁵ .................. F15B 13/044; F16D 31/02
[52] U.S. Cl. .......................... 91/459; 91/511; 60/403; 137/625.63; 251/25
[58] Field of Search ............ 91/178, 179, 180, 189 R, 91/361, 363 R, 363 A, 392, 397, 509, 511, 525, 532, 536, 470, 459, 519; 137/625.63, 625.64; 251/25, 30.01; 60/403, 405

[56] References Cited

U.S. PATENT DOCUMENTS

| | | | |
|---|---|---|---|
| 2,396,984 | 3/1946 | Broadston et al. | 60/404 |
| 2,597,418 | 5/1952 | Westbury et al. | 91/509 |
| 2,597,420 | 5/1952 | Westbury | 60/405 |
| 2,683,347 | 7/1954 | Abdo | 60/242 |
| 2,706,886 | 9/1955 | Michel | 60/242 |
| 2,897,786 | 8/1959 | Geyer | 60/405 |
| 3,308,619 | 3/1967 | Richardson et al. | 60/240 |
| 3,368,351 | 2/1968 | Wood et al. | 60/405 |
| 3,662,550 | 5/1972 | Lichtfuss | 60/405 |
| 3,813,990 | 6/1974 | Coppola et al. | 91/363 A |
| 3,898,916 | 8/1975 | Renner et al. | 91/509 |
| 4,065,094 | 12/1977 | Adams | 60/405 |
| 4,422,290 | 12/1983 | Huffman | 60/405 |
| 4,567,813 | 2/1986 | Garnjost | 91/363 A |
| 4,711,089 | 12/1987 | Archung | 60/405 |
| 4,714,411 | 12/1987 | Searle | 417/246 |
| 4,759,183 | 7/1988 | Kreth et al. | 60/422 |
| 4,848,848 | 6/1989 | Klein | 301/118 |
| 4,913,032 | 4/1990 | Wernberg | 91/361 |
| 4,966,065 | 10/1990 | Wardle | 91/361 |
| 4,984,505 | 1/1991 | Leeson et al. | 91/527 |
| 4,986,305 | 1/1991 | Richards et al. | 137/625.15 |

FOREIGN PATENT DOCUMENTS

| | | |
|---|---|---|
| 0375372 | 6/1990 | European Pat. Off. . |
| 380234 | 8/1990 | European Pat. Off. . |
| 3640453 | 6/1988 | Fed. Rep. of Germany . |
| 3703019 | 8/1988 | Fed. Rep. of Germany . |
| 2174824 | 11/1986 | United Kingdom . |

OTHER PUBLICATIONS

Olkydraulik und Penumatik 16/1972 *Redundante Stellantriebe* pp. 381–386.

Primary Examiner—Edward K. Look
Assistant Examiner—Hoang Nguyen
Attorney, Agent, or Firm—Jerome C. Squillaro; Bernard E. Shay

[57] ABSTRACT

The reliability of a fluid multiplexed actuation system is increased by arranging a pair of fluidic multiplexers in a parallel fluid flow path between a selector valve and several fluid actuators. Position sensors associated with the fluidic multiplexers and with the fluid actuators provide feedback signals to a microprocessor. In the event the feedback signals identify a malfunction in the fluidic multiplexer currently supplying fluid to the actuators, the microprocessor will deactivate the malfunctioning fluidic multiplexer and activate a redundant or back-up fluidic multiplexer by actuating the selector valve.

7 Claims, 5 Drawing Sheets

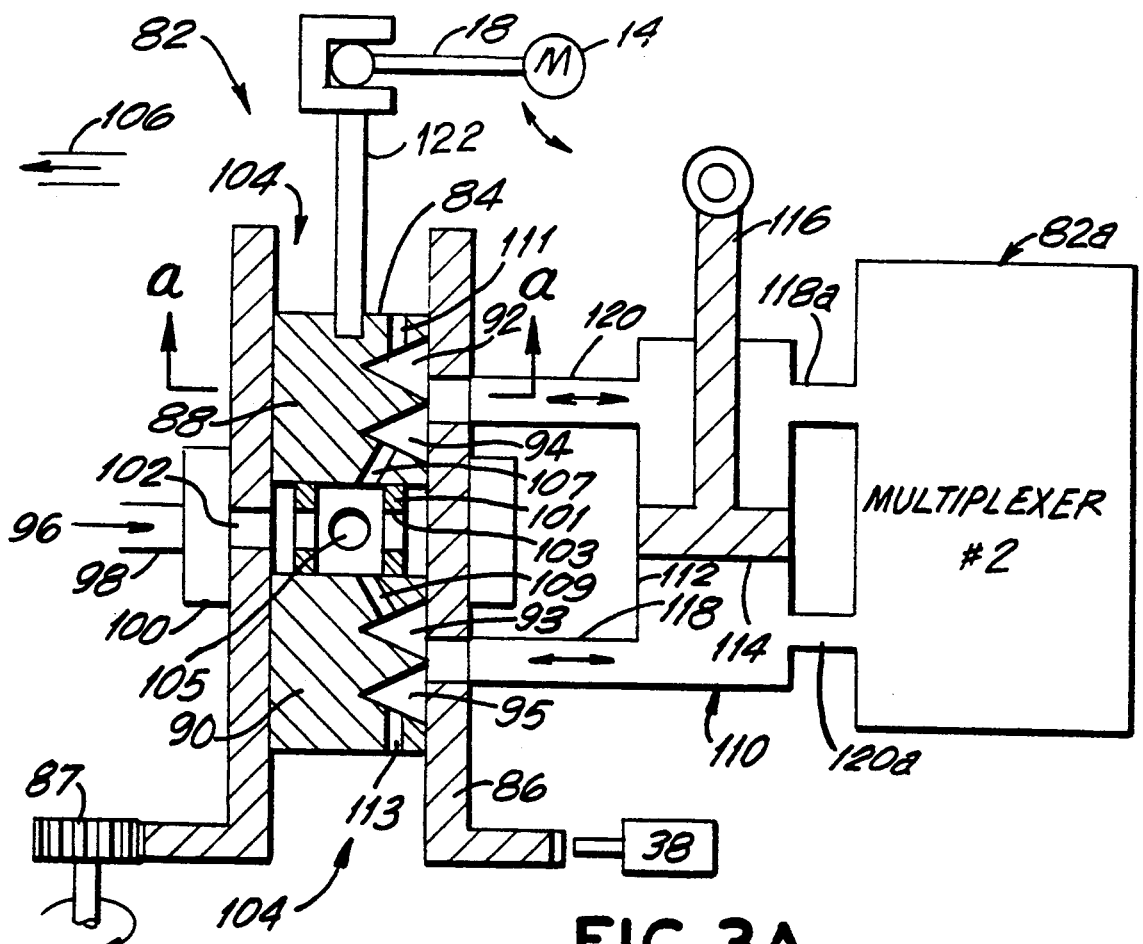
FIG. 3A
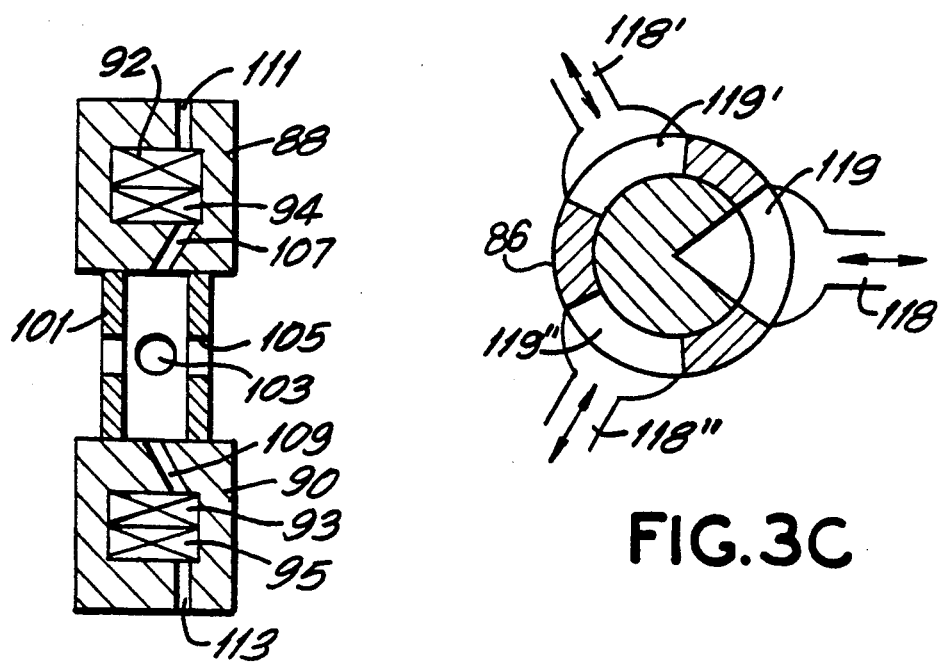
FIG. 3B
FIG. 3C

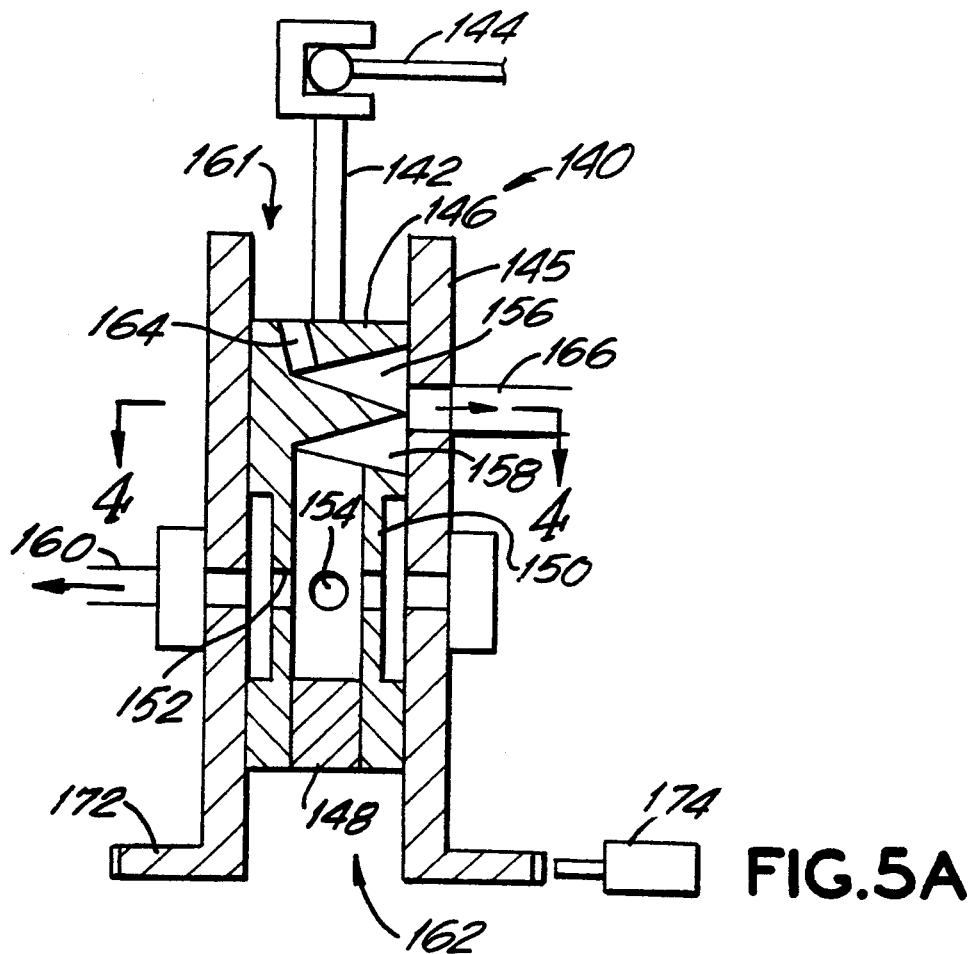
FIG. 5A
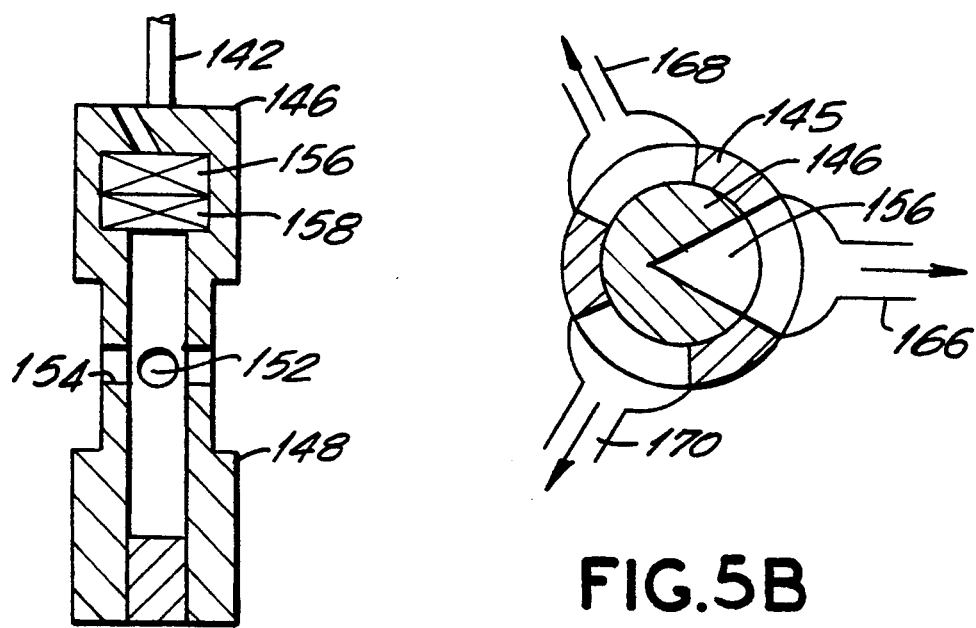
FIG. 5C
FIG. 5B

REDUNDANT FLUIDIC MULTIPLEXER

This application is a continuation of application Ser. No. 07/571,043, filed Aug. 22, 1990, now abandoned.

BACKGROUND OF THE INVENTION

1. Field of the Invention

The present invention relates in general to fluid actuated systems and particularly concerns a plurality of fluid pressure distribution networks arranged in fluidic parallelism to increase system reliability.

2. Description of Prior Developments

Fluid pressure distribution systems have been developed to supply a different fluid pressure and flow to each of several lines from a common source. These systems are capable of rapidly changing the pressure and flow in any selected line through a computer controlled valving arrangement known as a fluidic multiplexer. An example of such a system is disclosed in pending U.S. patent application Ser. No. 156,688 filed Feb. 17, 1988, and assigned to the Assignee of the present application, the entire specification of which is incorporated herein by reference.

Although fluidic multiplexers perform well for their intended purposes, such devices may present a reliability concern when controlled or operated under dual or redundant electronic control systems. That is, even though fluid-mechanical systems are generally considered less likely to fail than their associated electronic controls, recent developments in electronic controls have resulted in dual, or triple redundant electronic control systems. These redundant control systems provide very good electrical and electronic reliability which is far better than that of non-redundant control systems.

More particularly, should one electronic control system fail, a second control system automatically provides the required control signals to maintain the fluid-mechanical system in operation. However, should the single fluid-mechanical system fail, no back up is available with existing designs so that the single fluid-mechanical system now becomes the most likely source of failure. As fluidic multiplexers may be adapted for use in operating, for example, a gas turbine engine in an aircraft, reliability of the fluid-mechanical system and its associated electronic controls becomes a critical concern.

Multiplexers permit the control of a plurality of actuators from a single electronic control source. In an aircraft engine, one multiplexer can be utilized to operate several actuators. By way of an example, it can be used to simultaneously operate the actuator which opens and closes a bleed door for bleeding the pressurized air from a booster stage of the engine, for operating the actuators which control the engine variable stator vanes, thereby controlling the angle of attack of the compressor blades on the engine, for controlling the fuel valve which controls the amount of fuel delivered to combusters, and for thrust reversing and thrust vectoring systems. The actuators are generally in the form of pistons whose stroke is controlled by means of the hydraulic servo control system. It is foreseeable, that as gas turbine technology advances, and even greater numbers of hydraulic actuators will come into use.

As greater needs for actuators are defined, it becomes more practical to group the actuators for control by a single multiplexer. Accordingly, a need exists for a fluid mechanical system which provides a degree of reliability which matches or exceeds that of any associated dual or redundant electronic controls used to actuate the fluid-mechanical system. This is particularly the case with fluidic multiplexers used in aircraft gas turbine engines where dual or redundant electronic control systems are presently used to control a single or non-redundant fluid-mechanical or hydromechanical actuation system.

SUMMARY OF THE INVENTION

The present invention has been developed to fulfill the needs noted above and therefore has as a primary object the provision of a fluid-mechanical actuation system which operates at a level of reliability equal that of any dual or redundant electronic control system used to control the fluid-mechanical actuation system.

Another object is to provide a dual or redundant fluidic multiplexer for use with, for example, a plurality of gas turbine engine actuators, so as to significantly increase the level of reliability of a fluid multiplexed actuation system above that of a fluid actuation system having a single fluidic multiplexer or that of any other contemporary non-redundant actuation system.

Briefly, the invention includes at least a pair of fluidic multiplexers arranged or interconnected in a parallel fluid flow circuit. A selector valve is located in the common fluid supply and return lines which communicate with each fluidic multiplexer. Position sensors are provided to monitor the position and corresponding function or operation of each fluid actuator which is or may be controlled by one or both of the fluidic multiplexers. Each sensor provides a feedback signal to a control computer which not only controls the fluidic multiplexers but also operates the selector valve in response to the feedback signals from the position sensors.

In the event an actuator malfunctions, its position sensor will provide a signal to the control computer to automatically deactivate the fluidic multiplexer currently controlling that actuator. At the same time, the control computer will automatically activate the spare, back up or redundant fluidic multiplexer to return the malfunctioning actuator to proper operation. The deactivation of one fluidic multiplexer and the actuation of the other is effected through the computer controlled operation of the selector valve.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS
In the drawing:

FIG. 3a is a schematic view of an embodiment of a combined pilot and commutator valve and operating as a four-way servo valve;

FIG. 3b is an elevation view of the piston of FIG. 3a and taken 90° rotation therefrom;

FIG. 3c is a schematic cross-section of the cylinder of FIG. 3a at the location A—A thereof;

FIG. 5a is a schematic view which shows a three-way valve which has only one land and utilizes a regulated servo pressure;

FIG. 5b is a schematic view taken as a section along lines 4—4 of FIG. 4, and

FIG. 5c is an elevational view of FIG. 5a and rotated 90°.

In the various figures of the drawing like reference characters designate like parts.

DETAILED DESCRIPTION OF THE PREFERRED EMBODIMENT

Figures 1, 1A:
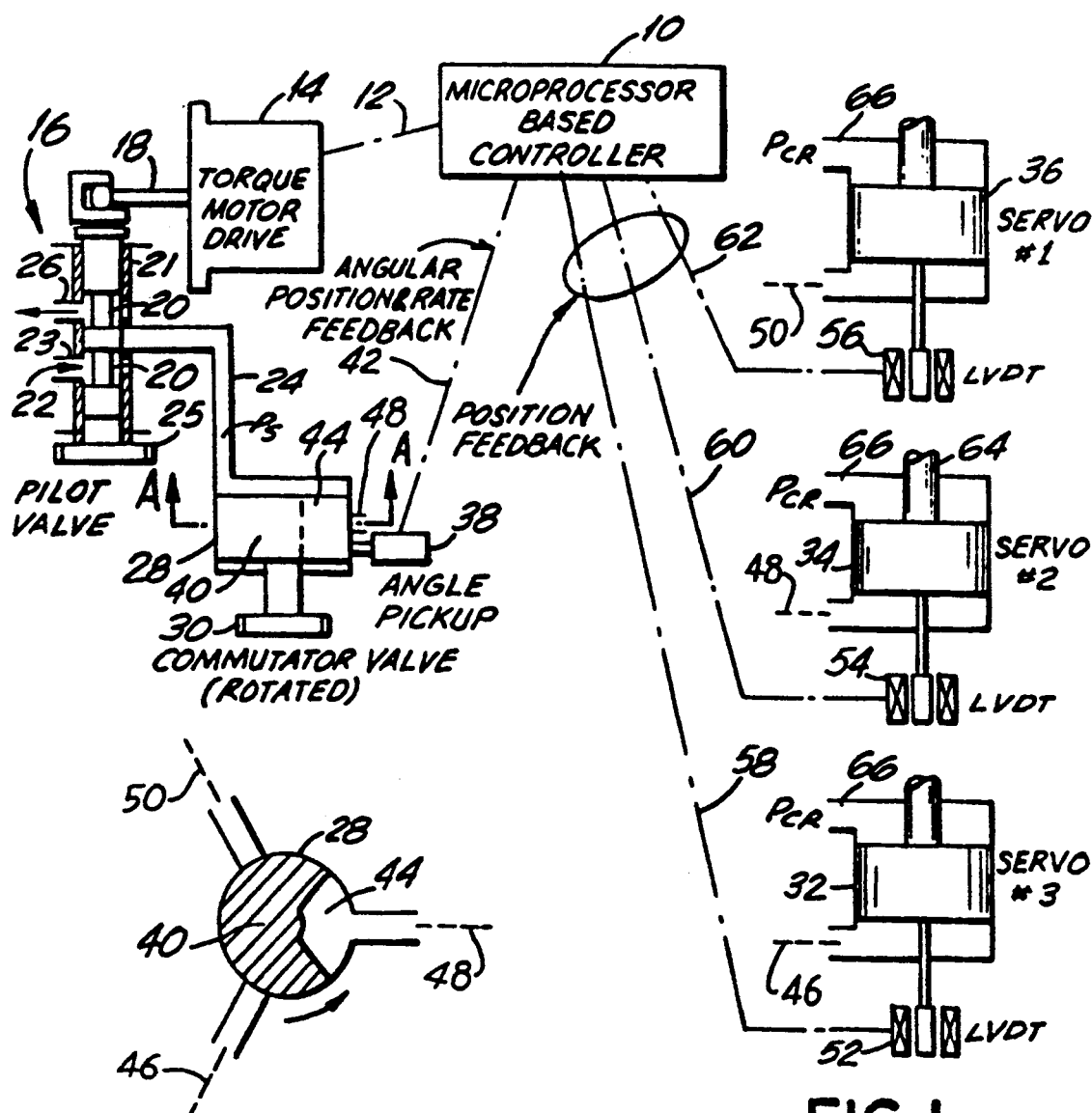
FIG. 1 is a schematic view of a single fluidic or hydraulic multiplexer system.
FIG. 1a is a schematic showing of a section taken along lines A—A of FIG. 1 and showing schematically details of the commutator valve.

The present invention will now be described in conjunction with the drawings, beginning with FIGS. 1 and 1a which shows in schematic form the general operation of a single fluidic or hydraulic multiplexer. As mentioned above, the detailed operation and structure of several forms of fluidic multiplexers are set forth in copending U.S. patent application Ser. No. 156,688. Any of the fluidic multiplexers disclosed therein or elsewhere may be readily adapted for use with the present invention, as set forth below.

Although single fluidic multiplexer systems are specifically detailed in the referenced copending application, a brief description of their general operation will aid in appreciating the benefits of the present invention. The single or non-redundant fluidic or hydraulic multiplexer system shown in FIG. 1 is controlled by an electronic controller such as control computer 10 which may take the form of a microprocessor based controller. Controller 10 is programmed to establish and coordinate command signals 12 sent to driver 14 which may take the form of a conventional torque motor.

Driver 14, at the command of controller 10, actuates a pilot valve 16 via rotating arm 18 so as to effect controlled reciprocation of an internal piston valve assembly 20 which is slidably mounted with the pilot valve mounted within a sleeve 21. The pilot valve sleeve 21 is rotated through a gear arrangement shown at 25. However, the sleeve could be non-rotational as well. As the piston sleeve 21 rotates around, pressurized fluid 22 flows from inlet 23 to pump 26 with a portion diverted to flow to the outlet 24. Through the reciprocation of the piston valve 20 the pressurized fluid, fed from the pump or any suitable fluid pressure source, is metered to thereby control the amount of fluid which flows to the outlet line 24 in accordance with instructions from the controller 10.

In this manner, the fluid within outlet line 24 may be selectively metered and controlled by controller 10 which sets and adjusts the axial position of the piston 20 within the pilot valve 16 via the torque motor drive 14. The fluid which enters the pilot outlet line 24 enters a commutator valve 28 which is rotated at a controlled rate through gear 30. Any power source may be used to drive gear 30, such as a motor.

Upon entering the commutator valve 28, the pressurized fluid from the pilot valve 16 is sequentially distributed to two or more fluidic motors or actuators via rotation of a valve element discussed below. In FIG. 1, three fluidic motors 32, 34, 36 are shown as fluid pistons driven or controlled by fluid pressure distributed by the commutator valve 28. Fluid servo motors or rotary fluid actuators may be used in place of or in combination with the fluid pistons.

An angular position and rate sensor 38, known in the art, monitors the position and rate of the rotating commutator valve element 40 and provides a corresponding angular position and rate feedback signal 42 to controller 10. Signal 42 informs the controller 10 when the outlet 44 of the rotating valve element 40 is in fluid communication with each fluid pressure input line 46, 48, 50 of each respective fluidic motor 32, 34, 36.

As the rotating valve element 40 may rotate at, for example, 60 revolutions per second or more, the pressure sequentially applied to the fluidic motors may be maintained virtually constant with respect to each individual fluidic motor, but may be varied in value from one fluidic motor to the next as dictated by the controller 10. Thus, for example, fluidic motor 32 may receive pressure at 500 psi, fluidic motor 34 may receive pressure at 1000 psi and fluidic motor 36 may receive pressure at 1500 psi during a single rotation of valve element 40.

By rotating valve element 40, the fluid sent into the outlet 24 will be commutated to the outlet 46. This will control the amount of pressure to be sent through line 46 to the particular fluidic motor 32.

Additional position sensors 52, 54, 56 are respectively associated with the fluidic motors 32, 34, 36 to provide feedback signals 58, 60, 62 to the controller 10 indicating the respective position or degree of actuation or stroke of each fluidic motor. Position sensors 52, 54, 56 may take the form of linear variable differential transformers (LVDTs) known in the art. Signals 58, 60, 62 may be compared with predetermined or selected signal values established by the controller 10 representative of the desired actuation position of each fluidic motor.

The operation of the fluidic multiplexer system outlined above is generally as follows. Based on a comparison of desired position signals with the values of the feedback signals 58, 60, 62 obtained from the fluidic motor position sensors 52, 54, 56, the controller 10 activates the torque motor drive 14 to reciprocate, thereby to increase, decrease or maintain the flow of pressurized fluid 22 through the outlet 24 of pilot valve 16. This may be carried out in the controller with a simple sum junction which produces a signal representing the difference between the desired and actual position of the fluidic motors and amplifies that difference to drive the torque motor.

The amount of pressure sent through outlet 24 controls the fluid pressure in the commutator valve 28. Through appropriate timing based upon the feedback signals and the pick-up detectors, the mechanism is regulated so that at the moment the commutator valve has its outlet 44 positioned adjacent one of the input lines 46, 48, 50, of the respective fluidic motors 32, 34, 36, the appropriate pressure is sent through line 24 to the valve element 40 for the correct amount of intersection with that pressure input line 46, 48, 50, to provide the needed pressure to the particular fluidic motor 32, 34, 36.

In the instantaneous position shown in FIG. 1, the pressurized fluid 22 entering commutator valve 28 is being directed through the outlet 44 of the rotating valve element 40 to input line 48 of fluidic motor 34. At this instant in time, feedback signal 42 from angular position sensor 38 informs the controller 10 that the fluid pressure metered through pilot valve 16 is controlling the intersection of the outlet 44 of commutator valve 28 to apply a pressure to fluidic motor 34. The controller then determines if that signal to the torque motor should be adjusted or maintained based on the position feedback signal 60 presently being generated by position sensor 54.

For example, should the controller 10 determine that the fluid pressure to fluidic motor 34 should be increased to drive actuator rod 64 upwardly in FIG. 1, the controller will provide a control signal 12, which will cause the pilot valve 16 to open so as to provide an instantaneous pulse of increased pressure through inlet 48 of fluidic motor 34 via commutator valve 28. It should be appreciated that the particular fluidic motors 32, 34, 36, shown in FIG. 1 are of the type which have as one of their input a constant regulated fluid pressure which is maintained in lines 66. Such pressure may be added value which may be at any instant greater or less than the pressure in the respective input lines 46, 48, 50. However, it should, likewise, be appreciated that instead of the single outlet 44 shown in the commutator valve in FIG. 1, which feeds only one side of the actuator valve with the other side being a controlled pressure, that two outlets could be had on the commutator valve, one feeding the pressure head and one feeding the pressure rod of the actuator valve, as will hereinafter be described in connection with another embodiment.

Thus, the fluid pressure sequentially distributed to each fluidic motor is coordinated by the controller 10 which is controlled by the operation of the pilot valve 16 which is axially positioned at a desired vertical height at the exact angular position of the rotating valve element 40 in the commutator valve 28. The value of the fluid pressure instantaneously distributed to each fluidic motor is determined based upon the feedback signals 58, 60, 62 generated by position sensors 52, 54, 56 which in turn result in the direction and degree of movement of the piston assembly 20 of pilot valve 16.

Although the fluidic multiplexer system described above generally functions reliably, it has been found that the reliability of the operation of the fluidic motors or actuators 32, 34, 36 can be enhanced if all electronic and electrical parts of the system are at least dual redundant. In the case of the electrical controller 10, the driving coils of the torque motor 14, the angle pickup 38, and the position feedback devices 52, 54, 56 would all be at least dual redundant. In this case, a back up electronic control system is provided to automatically take over operation of the fluid mechanical components of the fluid multiplexer system upon failure of the primary or initially controlling controller or any of the electrical input or output devices. As stated above, this increased reliability in the electronic controls results in the fluid-mechanical components becoming the weak link or most likely source of reliability problems and system failure.

Figure 2:
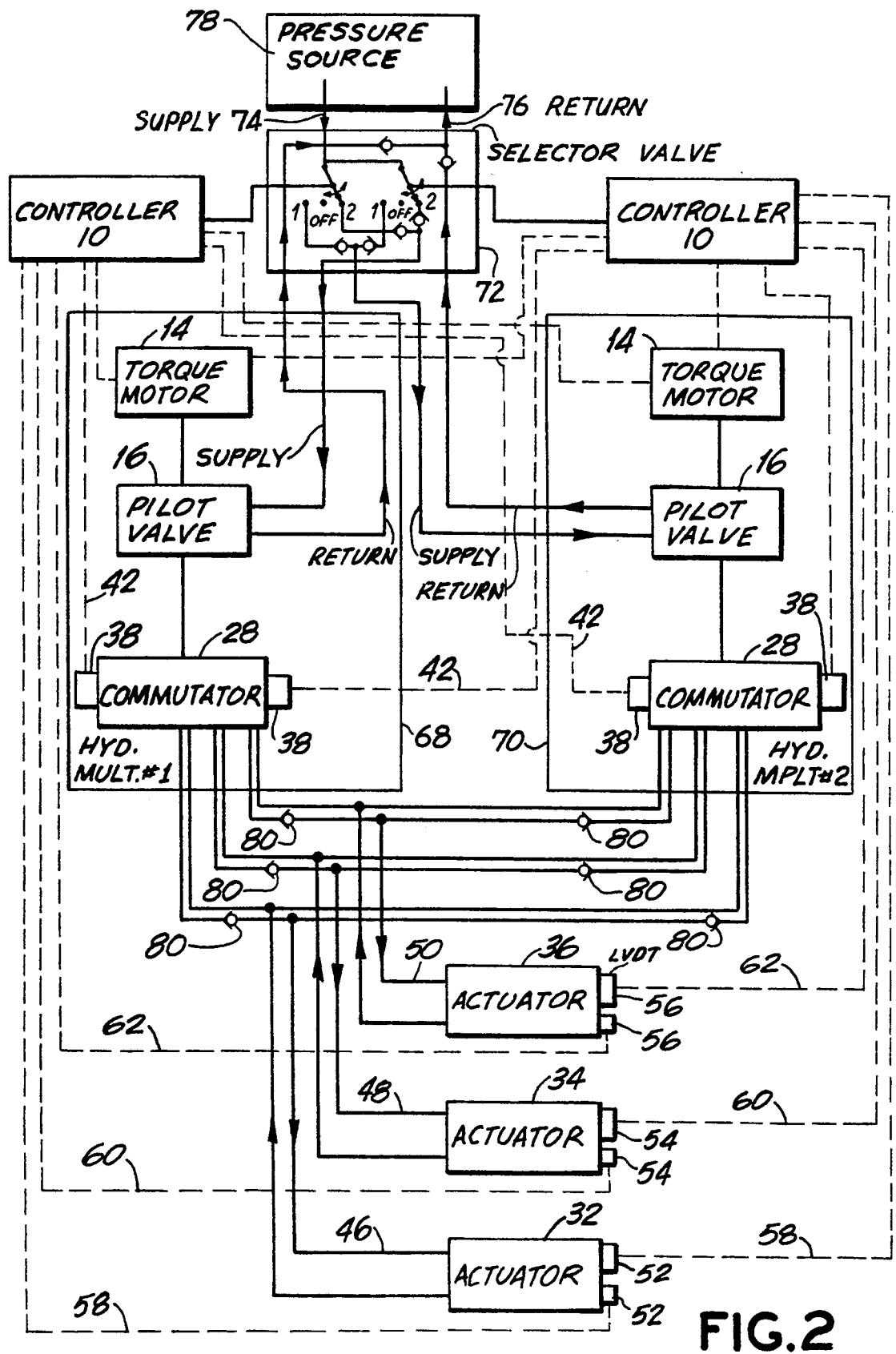
FIG. 2 is a schematic view of a dual or redundant fluidic or hydraulic multiplexer system according to the invention.

In order to increase the reliability of the fluid-mechanical portion of a fluidic multiplexer system having dual or redundant electronic controls and input and output signals and devices, the dual or redundant fluidic multiplexer system of FIG. 2 has been developed in accordance with the present invention. As seen in FIG. 2, a pair of fluidic multiplexer valve assemblies 68, 70 referred to as hydraulic multiplex No. 1 and No. 2, is connected in a parallel fluid circuit as described below. Although the fluidic multiplexer valve assemblies 68, 70 may take any specific form, each should include a pilot valve driver such as the torque motor drive 14 in FIG. 1, a pilot valve such as pilot valve 16 shown in FIG. 1, and a commutator valve such as commutator valve 28 shown in FIG. 1. Alternate constructions are available for each of these valves.

Of course, the necessary electronic control components and circuitry must also be provided for each fluid-mechanical valve assembly, such as described above in connection with FIG. 1. More particularly, with reference to FIGS. 1 and 2, each fluidic motor 32, 34, 36 in FIG. 2 may be selectively controlled by either one or both of two controllers 10. Each controller 10 should have its own set of actuator position sensors 52, 54, 56 on the actuators as well as its own angular position sensor 38 on each commutator valve.

Thus, it would be seen, that complete redundancy is provided in both the electronic and the hydraulic aspects, with the exception of utilization of only a single actuator. Thus, each controller 10 has control lines to each of the torque motors 14 in both the first and second multiplexer systems. Likewise, the controller receives feedback of the position of each of the commutator valves in both the first and second multiplexer system. Likewise, each of the two controllers receive independent position feedback from each of the actuators. As a result, each controller can control either or both of the multiplexer systems.

As further seen in FIG. 2, a selector valve 72, such as a solenoid-actuated spool valve, is positioned in both the fluid pressure supply and return lines 74, 76 of each multiplexer valve assembly 68, 70. Selector valve 72, under the control of each controller 10, is adapted to direct pressurized fluid from a source 78 of pressurized fluid to either or both of the multiplexer valve assemblies depending on their operational condition and to concurrently isolate any inoperative multiplexer valve assembly.

For example, should the multiplexer valve assembly 68 experience a mechanical failure, one or both of the controllers 10 will activate the selector valve 72 in response to control signals provided by their corresponding actuator position sensors 52, 54, 56 and/or angular position sensors 38. Valve 72 will then deactivate the multiplexer valve assembly 68 by redirecting the pressurized fluid from multiplexer valve assembly 68 to multiplexer valve assembly 70. Check valves 80 may be provided in the outlet lines of each multiplexer valve assembly 68, 70 to prevent any backflow of fluid through the deactivated multiplexer valve assembly.

The selector valve assembly may also be activated by controllers 10 to operate or select concurrent operation of both the multiplexer valve assemblies or deactivate them both. Each multiplexer valve assembly 68, 70 is designed to respond to dual or redundant electrical inputs from each controller so that either or both multiplexer valve assemblies may operate or power the fluidic motors 32, 34, 36. If one of the multiplexer valve assemblies should fail, the other multiplexer valve assembly will be able to assume full and identical control after the selector valve 72 has transferred the flow of pressurized fluid from the failed fluidic multiplexer assembly to the operative fluidic multiplexer assembly.

It is possible to combine the functions of the pilot valve and the commutating valve. The resulting configuration is shown in FIGS. 3a, 3b, and 3c for four-way valves, and by FIGS. 5a, 5b and 5c for a three-way system similar to that of FIG. 1.

With reference to FIGS. 3a, 3b and 3c, a combination pilot valve and commutator valve is shown generally at 82 which includes a single piston 84 contained within a cylinder 86. The cylinder 86 rotates through rotation means 87. Upper and lower piston heads 88, 90 are formed with two sectors cut out of their respective exterior portions. The sectors are angularly cut in the circumference of the round piston head and also have their top and bottom walls converging to the center. It should be appreciated that other cut out configurations could be used. Sector 92 is cut out of the upper portion of the piston head 88 and sector 94 is cut out of the lower portion of piston head 88. Likewise, sectors 93 and 95 are cut out of the lower piston head 90.

Fluid supply 96 is provided through inlet 98 and collector 100 and through cylinder opening 102. This fluid passes into the center tube 101 through the cross holes 103, 105 and then, respectively, through passages 107 and 109 to the inboard sectors 93 and 94. A return 104 is provided at each of the ends of the cylinder through port 106. The outboard sectors 92 and 95 are in communication with the return through passageways 111 and 113. It should be appreciated that the supplies and the returns can be interchanged.

A single actuator 110 is shown having a cylinder 112 in which reciprocates a piston 114 connected to a piston rod 116. A pressure head line 118 is provided as is also provided a pressure rod line 120.

Because of the dual redundancy of the present invention, there is provided a second commutator valve arrangement 82a, identical to that of the first commutator valve 82. It would therefore be appreciated that a second set of pressure rod and pressure head lines 118a and 120a are also provided to control the actuator 110.

The portion of the piston rod of the commutator which extends beyond the cylinder, identified as 122, is coupled to the output arm 18 of a torque motor 14. The reciprocation is controlled by the torque motor under operation of the controller. The valve sleeve 86 is rotated by a drive means such as a motor or by gearing 87 to the engine rotors. The speed and axial position of the valve sleeve are detected by sensor 38.

In response to axial reciprocation, portions of the upper piston head 88 are moved so that the cut-away section 94 will intersect the pressure rod line 120 to a greater or lesser extent. Likewise, greater or lesser portions of the lower piston head 90 will cover the pressure head line 118. The extent of intersection between the open sectors cut in the piston heads and the pressure lines will depend upon the desired amount of pressure and will be regulated by feedback through the controllers.

Fluid supplied from the supply 96 can enter the pressure rod line 120 through sector 94 and flow to the actuator. Fluid from the pressure head line 118 can be returned to the return through sector 95 and will be passed out through the return port 106. It should be appreciated that the flow can be reversed. Fluid can flow from the supply line 96 through the sector 93 to the pressure head line 118 and fluid returned to the return 106 through the pressure rod line 120 and sector 92. Thus, the movement of the actuator piston can be controlled with full fluid pressure in either direction.

Although only a single actuator 110 with its corresponding rod and head end pressure lines are shown in FIG. 3a, there are schematically indicated in FIG. 3c three such rod end lines 118, 118' and 118" exiting from three corresponding outlet ports 119, 119' and 119" in the cylinder 86 to control three actuators. Likewise, there would be three outlet ports for corresponding three rod pressure lines.

Figure 4:
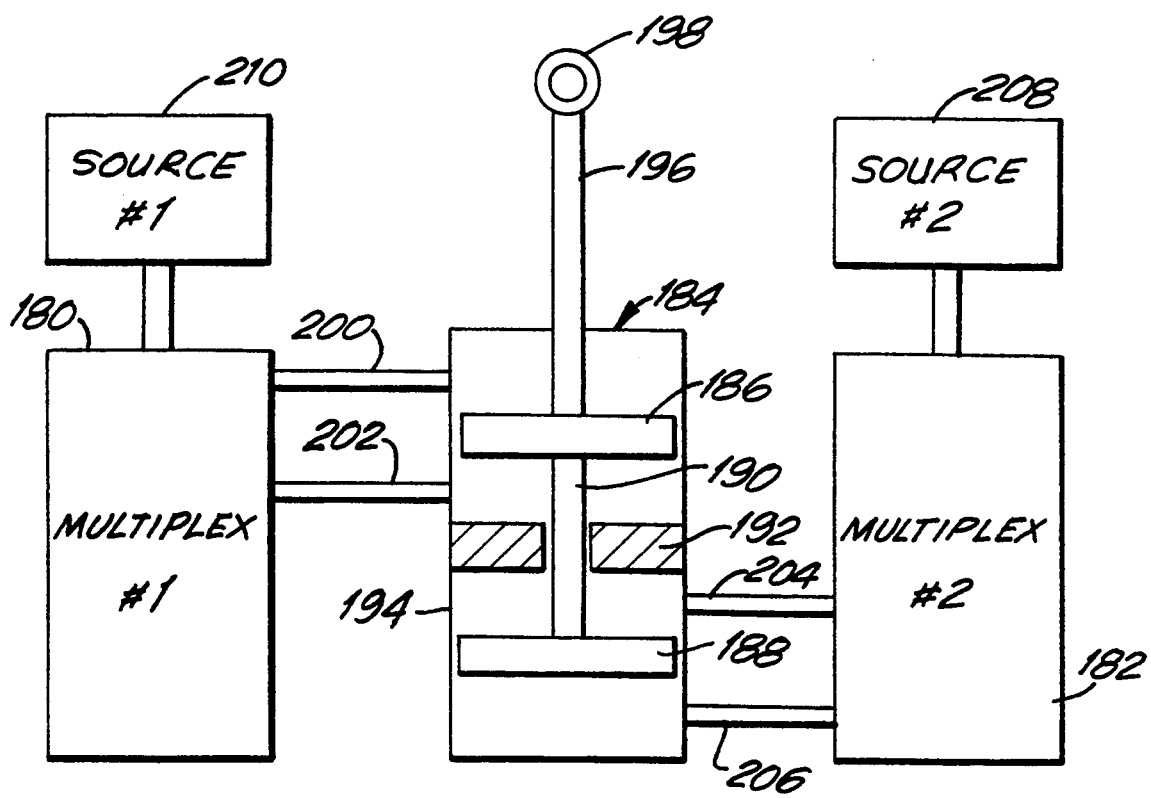
FIG. 4 is a schematic view explaining the use of the dual redundant multiplexer with a tandem piston arrangement for the actuators.

Referring now to FIG. 4, it will be shown that the dual redundant multiplexer units 180 and 182 can be connected to an actuator 184 having tandem pistons 186, 188. The tandem pistons are interconnected by means of a common piston rod 190 passing through a central bearing 192 within the cylinder 194. The output shaft 196 operates a desired mechanism 198.

The multiplexer unit number 1 indicated at 180, serves both a rod pressure line 200 and a rod head line 202. The multiplex unit number 2, indicated at 182, serves a separate rod pressure line 204 and a head pressure line 206.

Using the approach shown in FIG. 4 permits redundancy of the servo fluid sources to include separate sources 210, 208. This provides a method of further improving the system reliability.

Referring now to FIG. 5a, 5b and 5c, there is shown a three-way valve shown generally at 140 which is axially positioned by means of the shaft 142 extending down from a torque motor arm 144. The valve assembly is located within a rotated sleeve 145. The valve comprises an upper piston head 146 and a lower piston block 148 interconnected by a tube 150, in which is provided cross apertures 152, 154.

In the upper head, there is provided an upper output sector 156 and lower output sector 158. The upper sector 156 is in flow communication with a high pressure supply 161. The lower sector 158 is in communication with the lower tube to exit through passageways 152, 154 through the outlet 160. The bottom 162 of the piston is open for pressure balance.

Three outputs 166, 168, 170 are provided to feed three actuators. As the sleeve 145 rotates, it consecutively commutates the fluid output to the exits 166, 168, 170. Axial movement of the piston causes the supply from 161 to pass through 164 to the sector 156 and the amount of intersection between the sector 156 and the outputs 166, 168, 170 determines the particular pressure. The axial movement can also bring the sector 158 into communication with the outputs 166, 168, 170. In this way, the fluid pressures at the outputs 166, 168, 170 vary above and below a sixth control reference pressure so that the output actuators can move in either direction.

The sleeve is rotated by means of gears connected at 172. An angle pickup 174 would be provided as heretofore explained.

Through the use of the selector switch, it is possible to completely shut off one of the multiplexing valves. Little if any leakage will occur. The complete shut-off of this valve is enhanced by the fact that the torque motor driving the multiplex valve is designed to provide cut-off when saturated. Accordingly, when excess current is detected, it will inherently provide no flow in the pilot valve. This further enhances the cut-off of the non-operative multiplexer valve.

While typically the system will be operated with only one of the hydraulic multiplexing valves operative, it can also be arranged to have both of them operating. This can provide a double gain to the system if both are fully rated. However, if it known that both will be utilized, each can be rated at half gain and both utilized in parallel to provide the full gain.

Typically, with each one provided with full gain, only one of the multiplexing valves will be operating at a time. A single one will be operative until failure and when failure is detected through the feedback, the controller will automatically arrange to turn that one off through the selector valve and turn the other one on.

When both controllers fail, the pilot valves themselves can be formed to position the load actuators in a preferred failsafe position which will allow the engine to operate.

If any of the hydraulic multiplexing valves are positioned in the full extended position, by turning it off it will restore the operation on the other. Likewise, if there is no rotation in any one of the valves or if it is stuck in place and there is no stroke, by turning it off, it will restore operation on the other.

Although three actuators were shown as being controlled, it should be appreciated that the number is limited only by the physics of fluid flow. Optimally, between 2 and 6 actuators can be used. In similar fashion, the response of the actuators can be varied by closing or widening the slots of the commutator, or by feeding one output actuator with two or more outputs which need not be consecutive.

There has been disclosed heretofore the best embodiment of the invention presently contemplated. However, it is to be understood that various changes and modifications may be made thereto without departing from the spirit of the invention.

What is claimed is:

1. A system for distributing fluid pressure, comprising:
   source means of fluid pressure;
   a plurality of pressure lines connecting said source means to respective fluid-operated devices;
   first fluid multiplexing means for applying different fluid pressures to each line in a repeating sequence of line connections;
   second fluid multiplexing means for applying different fluid pressures to each line in a repeating sequence of line connections;
   valve means connected to the first and second multiplexing means; and
   control means for actuating the valve means so as to selectively operate said first and second fluid multiplexing means.

2. The system of claim 1, further comprising first sensor means operatively associated with said fluid operated devices and with said control means for initiating selection of said second fluid multiplexing means via said valve means upon detection by said first sensor means and said control means of undesired operation of said fluid operated devices when operated by said first fluid multiplexing means.

3. The system of claim 2 further comprising second sensor means operatively associated with said control means and said first fluid multiplexing means for initiating selection of said second fluid multiplexer means via said valve means upon detection by said second sensor means and said control means of undesired operation of said first fluid multiplexer means.

4. The system of claim 1, wherein said fluid operated devices comprise actuators having a cylinder, tandem pistons operatively positioned within the cylinder, a first group of pressure lines operatively coupling said first fluid multiplexing means to one of said tandem pistons, a second group of pressure lines operatively coupling said second fluid multiplexing means to another of said tandem pistons, and wherein said source means comprises separate first and second fluid sources, respectively, supplying said first and second fluid multiplexing means.

5. The system of claim 1, wherein said first and second fluid multiplexing means are each four-way valves.

6. The system of claim 1, wherein said first and second fluid multiplexing means are each three-way valves.

7. The system of claim 1, wherein said first and second fluid multiplexing means each comprise a unitary valve means including a piston means which can be axially position to control the amount of fluid output, and a rotating cylinder which sequentially brings the piston means into fluid communication with outlets corresponding to the fluid-operated devices, whereby said unitary valve means integrates the functions of a pilot valve and a commutator valve.

* * * * *